Sept. 14, 1954 P. M. HALL 2,688,948

TAPE DISPENSING AND MOISTENING MEANS

Filed Feb. 9, 1951 3 Sheets-Sheet 1

INVENTOR.
PRESTON M. HALL
BY [signature]
Attorney

TAPE DISPENSING AND MOISTENING MEANS

Filed Feb. 9, 1951 3 Sheets-Sheet 2

INVENTOR.
PRESTON M. HALL
BY
Michael Williams
Attorney

TAPE DISPENSING AND MOISTENING MEANS

Filed Feb. 9, 1951 3 Sheets-Sheet 3

INVENTOR.
PRESTON M. HALL
BY
[signature]
Attorney

Patented Sept. 14, 1954

2,688,948

UNITED STATES PATENT OFFICE 2,688,948

TAPE DISPENSING AND MOISTENING MEANS

Preston M. Hall, Warren, Ohio

Application February 9, 1951, Serial No. 210,188

4 Claims. (Cl. 118—42)

Figure 1:
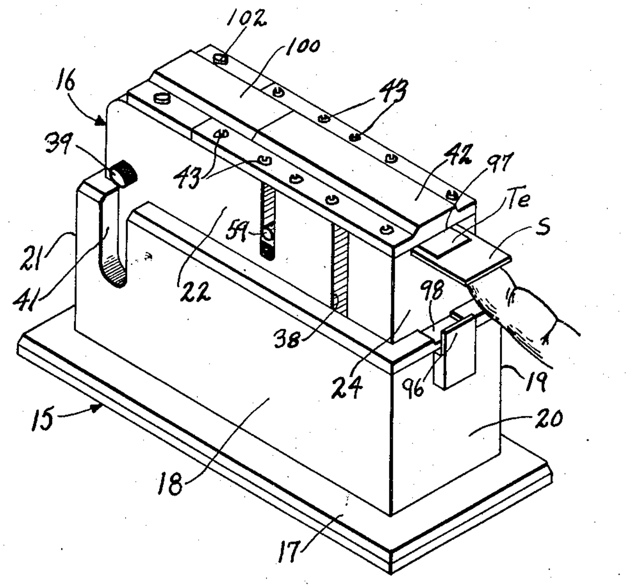

My invention relates to tape dispensing means and tape articles, more particularly to means for dispensing adhesive tape from roll form, and to adhesive tape articles, and the principal object of my invention is to provide new and improved means and articles of such character.

The invention provides a relatively inexpensive, yet sturdy and efficient device for dispensing lengths of adhesive tape from a roll, and accordingly such device has many uses and fulfills many requirements. For example, the device may be used to dispense tape for use in packing purposes and the like, it being appreciated that a properly selected tape will be used for particular requirements. The device has many other uses, and as a further example, the embodiment of the invention herein disclosed is particularly suitable for use by persons engaged in the stamp collecting art. In such latter use, the tape is preferably very thin and is dispensed in lengths corresponding to that of a stamp hinge.

The invention also provides a tape article, particularly an adhesive tape article, which has decided advantages over the prior art. Ordinary adhesive tape is subject to serious objections in that the adhesive extends to the edges of the tape and tends to adhere to unintended parts. This is particularly true in the case of stamp hinges, and many valuable stamps have been appreciably devalued because gummy moisture is squeezed out beyond the margins of the stamp hinge and causes adherence of the stamp to the supporting page or causes adherence of succeeding pages.

Figure 2:
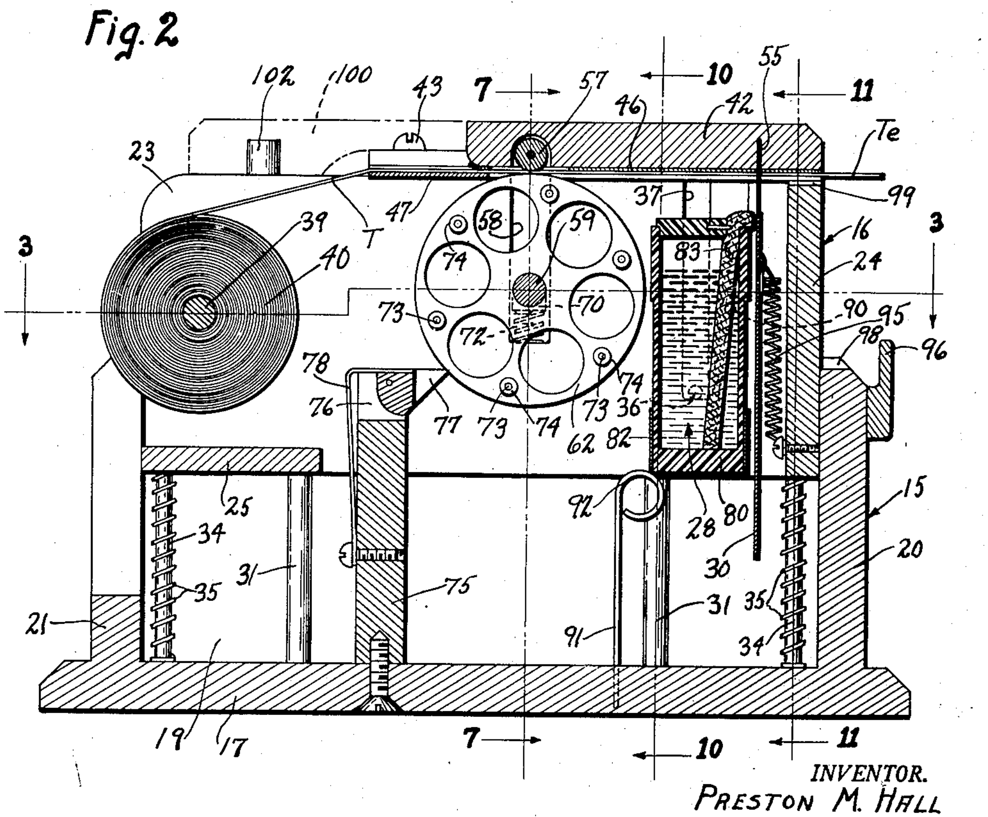
Figures 3, 4, 5, 6:
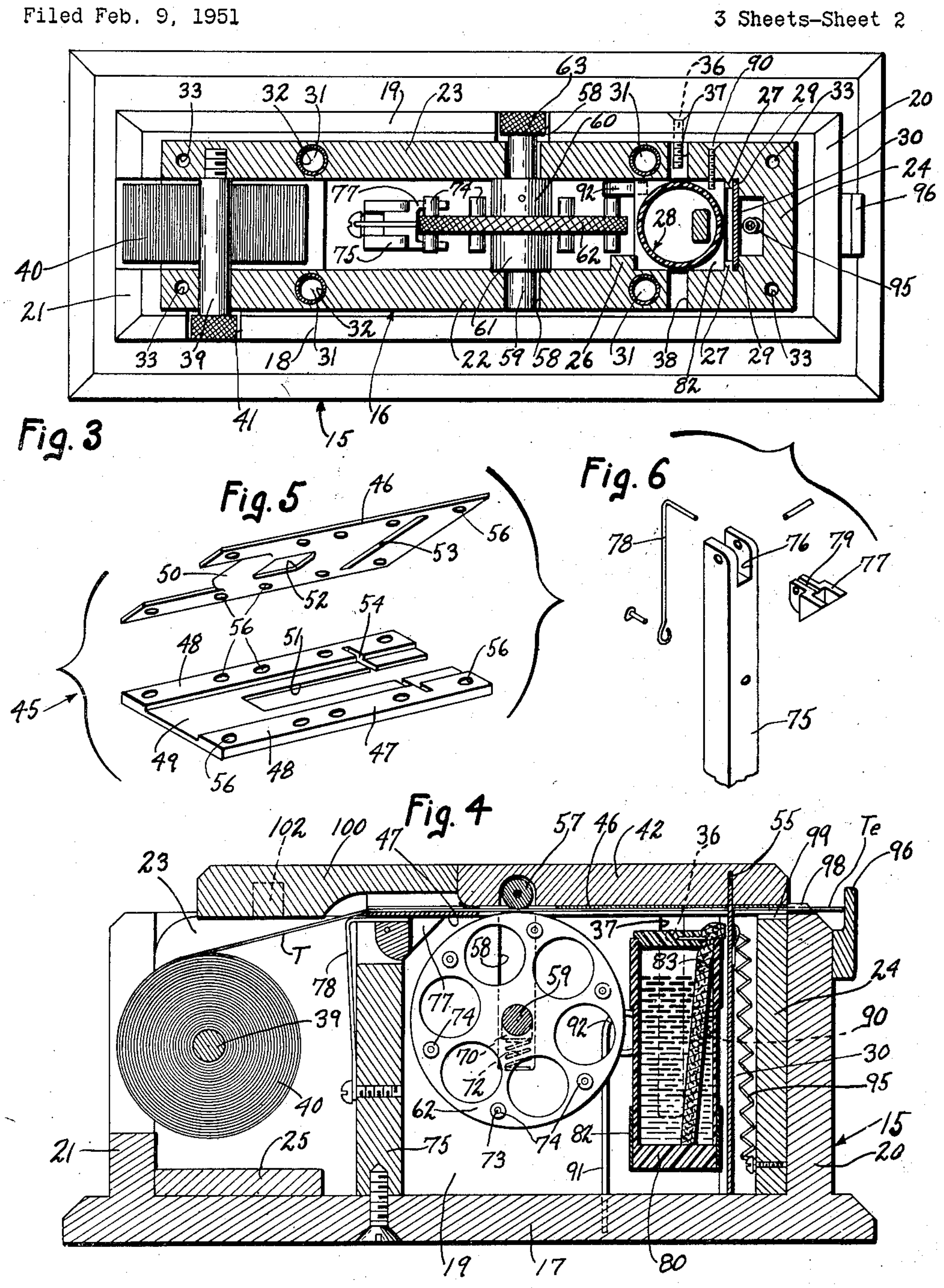
Figures 7, 8, 9, 10, 11, 12, 13, 14, 15:
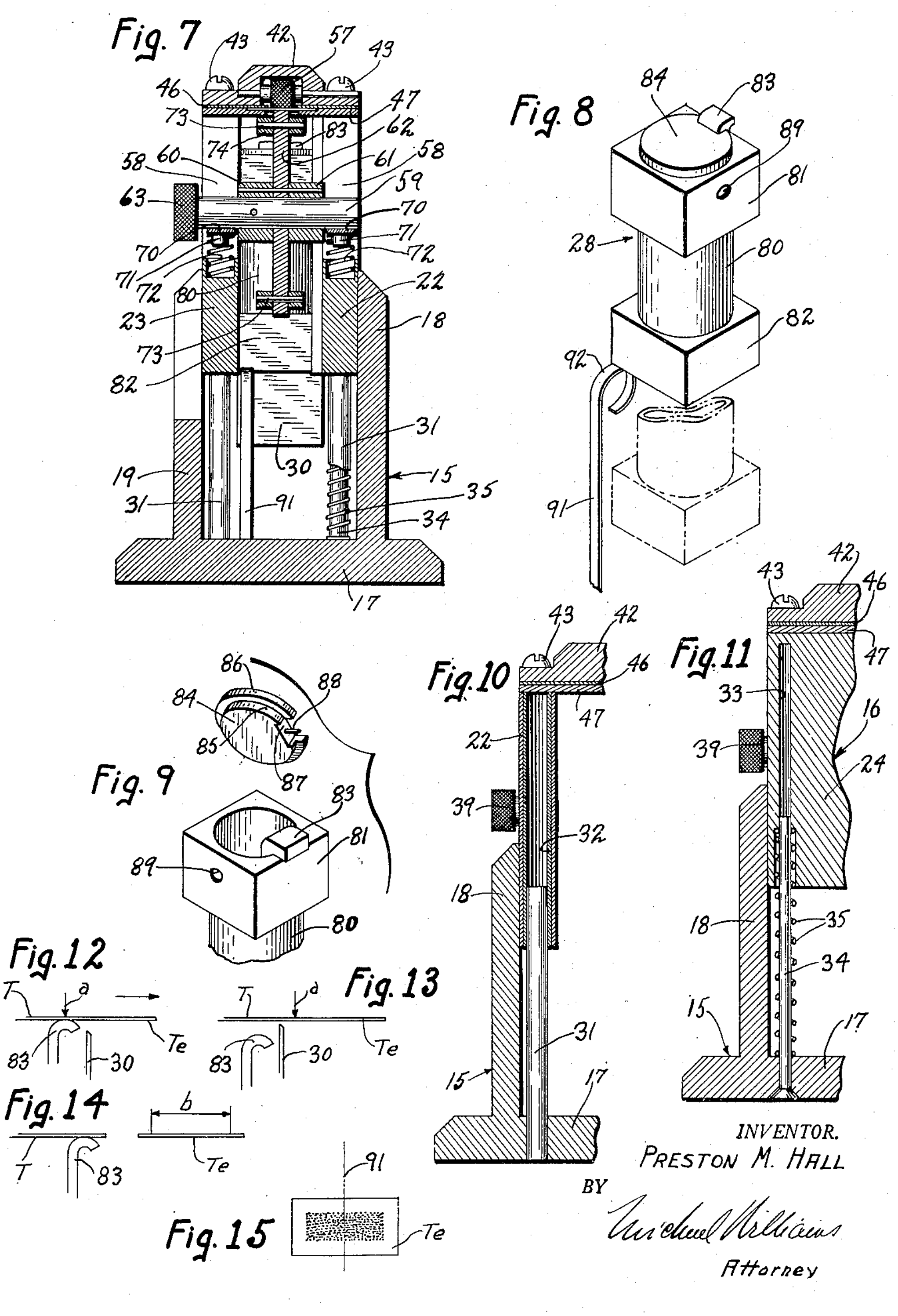

In the drawings accompanying this specification and forming a part of this application, there is shown, for purposes of illustration, an embodiment which my invention may assume, and in these drawings:

Figure 1 is a perspective view of a device embodying my invention,

Figure 2 is an enlarged longitudinal sectional view taken through the device shown in Figure 1, Figure 3 is a transverse sectional view corresponding generally to the line 3—3 of Figure 2, Figure 4 is a sectional view similar to Figure 2 but with parts in a different position, Figures 5 and 6 are exploded perspective views of details, Figure 7 is a vertical transverse sectional view corresponding generally to the line 7—7 of Figure 2, Figure 8 is a perspective view of the tape moistening device, Figure 9 is a fragmentary exploded perspective view of parts comprising the tape moistening device, Figure 10 is a fragmentary sectional view corresponding generally to the line 10—10 of Figure 2, Figure 11 is a fragmentary sectional view corresponding generally to the line 11—11 of Figure 2, Figures 12 through 14 are generally diagrammatic views illustrating steps in the operation of the dispenser, and Figure 15 is a plan view of an article of manufacture, which article may be produced by the device shown in the preceding figures.

Referring to the drawings, the device therein shown to disclose my invention comprises first and second bodies 15 and 16 which are connected for relative movement. The body 15 forms a base (and will hereinafter generally be termed as a base) and comprises a bottom wall 17, side walls 18 and 19 and end walls 20 and 21, the foregoing walls providing an open-top box-like formation.

The body 16 comprises side walls 22 and 23 and one end wall 24, the opposite end of the body being preferably open for a purpose later to appear. The body 16 has a short lower wall 25 which extends between the side walls 22, 23. The body 16 is further formed with an upright guide rib 26 (see Figure 3) extending inwardly from the side wall 22. Spaced from the rib 26 in a direction toward the end wall 24 are a pair of upright ribs 27 extending inwardly from respective side walls 22, 23, these ribs cooperating with the rib 26 to provide guides for vertical reciprocation of a tape moistening device 28 which will be described in detail later. The ribs 27, 27 are of stepped formation and upright slots 29 are provided therein for guiding reciprocating movement of a knife 30.

The body 16 is adapted to telescopically fit within the base 15 for movement toward and away from the base wall 17. Preferably, the transverse exterior size of the body 16 is slightly less than the opening defined by the inner surfaces of the walls 18, 19, 20 and 21 of the body 15 so that the body 16 is out of frictional contact with such inner wall surfaces.

To maintain the body 16 in true sliding relationship with the base 15, the latter is provided with four spaced-apart upright rods 31 (see especially Figures 3 and 10), each having sliding bearing fit within a respective sleeve 32 secured within elongated apertures formed in the side walls 22, 23 of the body 16. The body 16, at each of its four corners, is formed with an elongated vertically extending recess 33, each recess slidably receiving the shank of a stud 34 (see especially Figure 11). A coil spring 35 encircles a respective stud 34 and is interposed between the inner surface of the bottom wall 17 of the base 15 and the bottom of a counterbore of the recess 33. It will be appreciated that the springs 35 operate to urge the body 16 in a direction outwardly of the base 15. To prevent complete unintentional withdrawal of the body 16 from the base 15, a machine screw 36 (see Figure 3) is threaded through the side wall 19 of the base 15 and such screw is engageable with the bottom of a slot 37 (see Figure 2) formed in the side wall 23 of the body 16 to limit outward movement of the body 16. A similar slot 38 is formed in the opposite side wall 22 of the body 16, and the slots 37 and 38 provide means for viewing of the moistening device 28.

The side walls 22 and 23 of the body 16 are apertured to receive a shaft 39 which carries a roll of tape 40. In the embodiment shown, the shaft is in the form of a stud which has a reduced end threaded into the side wall 23 and has its opposite end headed for manipulation purposes. The side wall 18 of the base 15 is slotted, as at 41, to provide for free passage of the head of the shaft when the body 16 is moved inwardly of the base 15. Overlying the upper terminal margins of the walls 22, 23 and 24 of the body 16 is a cap 42 which has a preferably plane undersurface and which may be secured to the body 16 by means of cap screws 43 threaded into the side walls 22, 23.

Interposed between the undersurface of the cap 42 and the upper terminal margins of the walls 22, 23 is a tape-guiding piece 45 (see especially Figure 5). The guiding piece 45, as herein shown, comprises an upper plate 46 and a lower plate 47. The lower plate is formed with thickened portions 48 at opposite side edges forming therebetween a trough 49 which has its upwardly directed opening closed by the upper plate 46 to provide a recess for receiving and guiding the tape T. The upper plate 46 has an upwardly curved lip 50 to facilitate threading of the tape into the recess.

The lower plate 47 is centrally and longitudinally slotted, as shown at 51, and the upper plate is provided with a short slot 52 adapted to align with a portion of the slot 51. The upper and lower plates are transversely slotted, as shown at 53 and 54, and these slots are aligned and provide a shearing edge for the knife 30. The cap 42 is provided with a recess 55 which aligns with the slots 53, 54 to provide for clearance of the knife 30. The upper and lower plates are also formed with aligned apertures 56 to pass the cap screws 43 which hold the cap 42 and tape guiding piece 45 in assembled relation with the body 16.

The cap 42 is transversely recessed to accommodate a roller 57 which is journalled on a pin extending into the side walls of the cap. The roller 57 is of such diameter that its surface extends through the slot 52 in the upper plate 46 and into position for engagement with the upper surface of the tape within the trough 49. Preferably, the surface of the roller 57 is knurled to facilitate proper driving engagement with the tape.

The side walls 22, 23 of the member 16 are provided with vertically extending slots 58 (see Figures 1, 3 and 7) which open into the upper terminal margins of such side walls, the opening into the slots 58 being closed by the overlying tape-guiding piece 45 and the cap 42. The slots 58 accommodate a transverse shaft 59 on which are fixedly mounted spaced-apart collars 60, 61 (see especially Figure 7), and positioned between the collars is a disc-like wheel 62. In the embodiment disclosed, the collar 60 is pinned to the shaft 59 and another pin connects the collars and the wheel to complete the assembly. The shaft 59 may be provided with a headed portion 63 for manual manipulation purposes.

In the present embodiment the shaft 59 is yieldably supported and the supporting means herein disclosed comprise a pair of bearings 70 which engage spaced parts of the shaft, each bearing having a cylindrical depending portion 71 for receiving the upper end of a respective coil spring 72, the lower end of each spring seating in a recess formed in the respective side walls 22, 23 of the body 16. Thus, the wheel 62 is urged upward toward contact with the roller 57 (the slot 51 in the lower plate 47 of the guiding piece 45 providing for such contact) and an extended portion of the tape disposed between the roller 57 and wheel 62 will be fed by proper rotation of the wheel. The peripherial surface of the wheel 62 is preferably knurled so that it will engage the tape and feed it without slipping.

Spaced-apart in circular formation about the wheel 62 are a plurality of pegs 73, each extending transversely of the wheel and having portions extending from opposite sides of the wheel. A roller 74 is journalled on each extending portion of each peg 73 and the extremities of each peg may be headed to retain the respective rollers in place.

An upright standard 75 is supported by the base wall 17 (see Figures 2 and 4), this standard being slotted, as at 76, at its upper end (see Figure 6) to provide for pivotal support of a pawl 77. A spring 78 is carried by the standard 75 and has an angular portion seated in a slot 79 in the pawl 77 for the purpose of yieldably urging the pawl to position shown in Figure 2 wherein a portion of the pawl engages the standard and prevents clockwise movement of the pawl. The pawl is provided with a bifurcated portion, the legs of which are adapted to straddle the wheel 62 and engage with the oppositely extending rollers of any one of the pegs 73.

As the body 16 is moved inwardly of the base 15 (by manual force) the wheel 62 carried thereby is correspondingly moved downwardly to present a set of rollers 74 against the upper surface of the pawl legs, and continued inward movement of the body 16 will cause clock-wise rotation of the wheel 62 an amount determined by the length of time the engaged rollers 74 remain in contact with the pawl legs.

When the body 16 has reached its innermost position (see Figure 4) the pawl legs will have cleared the previously engaged rollers 74. On release of manual pressure on the body 16, the body is spring-pressed to its outer position as shown in Figure 2. In travel to such outer position, the pawl legs will wipe past the succeeding pair of rollers 74, its pivot permitting it to swing upwardly slightly so as not to engage such succeeding rollers in driving relation. Therefore, the wheel 62 will be rotated clockwise a predetermined amount each time the body 16 is pressed inwardly of the base 15, and the extended tape portion within the guide recess and between the roller 57 and wheel 62 will be moved forwardly in amount equal to the angular rotation of the wheel 62.

As best seen in Figures 2, 4 and 7, the tape T is extended from the roll 40 and is extended through the guide recess formed by the tape-guiding piece 45 and in between the roller 57 and wheel 62, so as to extend forwardly (to the right as viewed in Figures 2 and 4). Each time the body 16 is pressed inwardly of the base 15, the tape will be fed a predetermined amount, as will be appreciated. When pressure on the body 16 is removed and the body is spring-pressed to starting position, the tape will not be moved in either direction.

In the present embodiment, the tape T is provided with mucilage on its under surface and provision is made for moistening the mucilage as the tape is fed. The moistening means 28, as herein disclosed, comprises a container 80 for containing the moistening fluid, which usually is water. The container 80 is preferably made of transparent material, such as clear plastic, so that the amount of liquid contained therein is readily visible.

In the present case, the container 80 is formed with an integral square upper head 81 and with a spaced square lower head 82. The lower head is preferably formed of a wearing material, such as a suitable metal, and preferably is formed with an opening for receiving the lower end of the container 80. It will be appreciated that the lower head 82 and the container 80 may be secured together in any suitable manner and that the square heads 81, 82 provide shoulders, or abutments, for a purpose to be disclosed.

A wick 83 is disposed within the container 80 and a cap 84 is provided for closing the upper end of the container, this cap having a plug portion 85 adapted to frictionally fit within the container opening and a flange portion 86 adapted to overlie the container opening. The cap 84 is formed with a slot 87 to pass the upper end of the wick 83, and extending from the defining walls of the slot 87 (see Figure 9) is a prong 88 which pierces the upper portion of the wick and prevents unintentional displacement of the wick. A small opening 89 is provided near the top of the container for filling purposes, and such opening is accessible through one of the elongated viewing slots 37, 38 formed in the side walls of the body 16. On assembly, the defining walls of the slot 87 in the cap 84 pinch the upper portion of the wick 83 against a defining wall of the opening into the container 80, and the outer extending portion of the wick is thereby curled forwardly, as best seen in Figures 2 and 4.

The container 80 is guided for upright sliding motion with respect to the body 16 by the rib 26 and the spaced ribs 27. A machine screw 90 (see Figures 2, 3 and 4) is threaded into the side wall 23 of the body 16 in position so that its extremity is engageable with the shoulder formed by either one of the upper or lower heads 81, 82. Engagement with the lower head 82 will prevent the container from being entirely withdrawn from the body 16, and the purpose for engagement with the upper head 81 will presently appear.

Secured to the bottom wall 17 of the base 15 in any suitable manner, and extending upwardly therefrom is a leaf spring 91 which has its upper end curled, as shown at 92. In the outer position of the body 16, the curled end 92 of the spring 91 is engageable with the under surface of the lower head 82 and yieldably supports the container in an upper position wherein the outer end of the wick 83 is spaced from the under surface of the tape T, as seen in Figure 2.

As the body 16 is pressed inwardly of the base 15, the curled end 92 of the spring 91 still supports the container 80 so that such container is moved relative to the body 16 and is thus pressed into engagement with the under surface of the tape T as the tape is moved therepast, and the mucilage portion of the tape is moistened by such engagement. As the body 16 is further pressed inwardly of the base 15, the container 80 is held against further relative movement with respect to the body 16 by reason of the fact that the extended portion of the wick 83 bears against the under surface of the tape T. Therefore, the under surface of lower head 82 is caused to press against the curled end 92 of the spring 91, and the spring is flexed to the left (as viewed in Figure 2) and the curled end 92 slides along the side of the lower head until it reaches the reduced area between the upper and lower heads, whereupon the curled end 92 will move into such reduced area and will permit the container to drop by gravity until the under surface of the upper head 81 engages with the curled end 92 of the spring 91. The container 80 is thus dropped sufficiently so that the extended portion of the wick 83 is out of engagement with the under surface of the tape T.

On spring-pressed return movement of the body 16, the end of machine screw 90 engages under the upper head 81 and draws the container 80 upwardly, thereby causing flexing of the spring 91 so that the curled end 92 wipes across the surface of the lower head 82 and finally snaps back under the lower head to again support the container in position shown in Figure 2.

The tape severing knife 30 comprises a flat blade which is guided for upright movement by the defining walls of the slots 29 and in position so that its cutting extremity moves through the shearing edges formed by the slots 54, 53 of the tape-guiding piece 45, and into the recess 55 of the cap 42 when the body 16 is pressed completely inwardly of the base 15. Thus, as the cutting extremity of the knife passes through the shearing edges of the slots 54, 53, the tape portion extending through the tape-guiding piece 45 is severed. A coil spring 95 has its upper end connected to the knife 30 and its lower end connected to the lower inner surface of the end wall 24 of the body 16. Therefore, the knife 30 is constantly urged in a downward direction by the spring. However, the blade of the knife is of such length that its lower end will engage the inner surface of the bottom wall 17 of the base 15 prior to the time that the body 16 has been completely pressed inwardly of the base 15. Thus, the knife edge is moved through the slots 54, 53 of the tape-guiding piece 45 to sever the tape.

The sequence of operations will now be described, it being assumed that tape from the roll 40 has been extended and threaded through the tape-guiding piece 45 sufficiently so that its extremity extends beyond the slots 54, 53 of such piece. Upon initial inward movement of the body 16, the container 80 is held by the spring 91 so that the extended portion of the wick 83 engages the under surface of the tape T. Preferably shortly thereafter, the legs of the pawl 77 engage adjacent pairs of rollers 74 on the wheel 62, and the wheel is rotated to feed the tape forward.

Preferably, just prior to the time feeding of the tape is interrupted by reason of the legs of the pawl leaving the rollers 74, the curled end 92 of spring 91 enters the space between the upper and lower heads 81, 82 of the container 80, and the container drops to positions shown in Figure 4, wherein it is supported by engagement of the curled end 92 with the under surface of the upper head 81 and in such position the wick is out of engagement with the under surface of the tape. Preferably just after feeding of the tape is interrupted, the cutting edge of the knife 30 is moved through the slots 54, 53 of the tape-guiding piece 45 to sever the extended and moistened tape portion.

Since the rollers 74 are equally spaced about the wheel 62, the feed of tape will be exactly the same for each operation and such feed may be predetermined by proper spacing of the rollers 74. In the present case, the feed is of such length that the outer end of the severed portion of the tape will abut a finger 96 (see especially Figure 4). Since the tape is held by engagement of the wheel 62 with the roller 57 and also abuts the finger 96 at the end of feeding operation, the tape will not tend to crawl during cutting operation by the knife 30.

Figures 12 through 15 illustrate generally diagramatically step-by-step operations of the moistening device and the knife. In Figure 12, the wick 83 is in contact with the tape T and the tape is being fed in the direction of the arrow. Figure 12 illustrates the condition when the wick 83 is just ready to drop from contact with the tape. Thus the point marked *a* represents the most rearward point of moisture on the extended tape portion T*e*.

In Figure 13, the wick 83 has been dropped from contact with the tape but the tape has been fed so that point *a* has been moved forward to the position shown. The knife 30 is shown in position ready to cut the tape and sever the extended portion T*e* from the remaining tape portion. Thus, it will be appreciated that the extended tape portion T*e* is not moistened in an area extending inwardly from the rear edge of such portion.

In Figure 14, the extended tape portion is shown severed and moved for use and the wick 83 has again been moved into contact with the tape T. Because of the bent end of the wick 83, the tape is not moistened in an area extending inwardly from its front edge so that the tape portion is only moistened a distance represented by the dimension *b*. In the presently disclosed embodiment, the wick 83 is of a width that is less than the width of the tape and therefore only an intermediate longitudinal portion of the tape will be moistened. Accordingly, the severed tape portion will be moistened only in the area indicated by the stippling in Figure 15.

My improved tape dispenser may be used by persons involved in the stamp collecting art, and the dispenser may be so constructed and arranged that it will dispense stamp hinges. A stamp hinge comprises a thin piece of paper of a size such as shown in Figure 15 and the paper is provided with mucilage on one surface thereof. In use, the hinge is folded along a transverse line, such as the line 91, with the mucilage portions disposed outwardly. If the hinge is formed by the dispenser herein disclosed, the mucilage is already moistened so that a stamp may be stuck to one flap of the hinge and the other flap may be stuck to a supporting surface, such as a page in a stamp collecting book.

As seen in Figure 1, when the body 16 has been spring-pressed to outer position, the severed tape portion T*e* extends partially outwardly of the guiding piece 45, and such extension may be regulated to proper amount so that the extended portion is the right length to form a hinge flap. A user may position a stamp S on his finger and press such stamp against the hinge flap, the outer surface of the end wall 24 of the body 16 providing a gage against which an edge of the stamp may be abutted. After the stamp S has been stuck to the hinge flap, the user may move his finger upwardly so as to bend the extended hinge flap about the edge 97 of the cap 42 and thus form the other flap of the hinge. The now folded portion T*e* may be withdrawn from the dispenser and the stamp may be immediately mounted on a page of a collecting book.

As best seen in Figure 4, the end walls 20 and 24 of the base 15 and body 16, respectively, are provided with notches 98, 99, respectively, these notches being of sufficient depth so that the undersurface of the tape is maintained clear of contact with the end walls so that mucilage will not collect and interfere with smooth operation of the dispenser. If desired, an additional cap 100 may be provided to protect the tape roll and tape from deposit of any foreign material which may affect smooth operation of the dispenser. The cap 100 may provide apertures which fit over projections 102 extending upwardly from the upper surface of the side walls 22, 23.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Adhesive tape dispensing means, comprising: first and second bodies connected for relative movement, one of said bodies having means for carrying a roll of adhesive tape; driving means engageable with the tape and actuated by relative movement of said bodies to move said tape in dispensing manner; moistening means operable to have wiping engagement with the dispensed tape and actuated by relative movement of said bodies; and knife means, actuated by relative movement of said bodies and operable to sever the dispensed tape.

2. Adhesive tape dispensing means, comprising: a base; a body slidably mounted on said base and having means for carrying a roll of tape, said body having a guide for receiving a portion of the tape extended from said roll; a tape moistening device supported by said base and adapted to be in moistening engagement with said tape at least during a portion of the time said tape is moved so as to moisten at least a portion of said tape as it is fed thereby; shiftable means carried by said body and frictionally engageable with said extended tape portion; drive means carried by said base and engageable with said shiftable means through sliding action of said body to drive said shiftable means and cause the same to feed and further extend said tape portion; and knife means actuated by sliding action of said body after said tape portion has been further extended a predetermined amount, to sever at least a part of said tape portion.

and wheel 62, so as to extend forwardly (to the right as viewed in Figures 2 and 4). Each time the body 16 is pressed inwardly of the base 15, the tape will be fed a predetermined amount, as will be appreciated. When pressure on the body 16 is removed and the body is spring-pressed to starting position, the tape will not be moved in either direction.

In the present embodiment, the tape T is provided with mucilage on its under surface and provision is made for moistening the mucilage as the tape is fed. The moistening means 28, as herein disclosed, comprises a container 80 for containing the moistening fluid, which usually is water. The container 80 is preferably made of transparent material, such as clear plastic, so that the amount of liquid contained therein is readily visible.

In the present case, the container 80 is formed with an integral square upper head 81 and with a spaced square lower head 82. The lower head is preferably formed of a wearing material, such as a suitable metal, and preferably is formed with an opening for receiving the lower end of the container 80. It will be appreciated that the lower head 82 and the container 80 may be secured together in any suitable manner and that the square heads 81, 82 provide shoulders, or abutments, for a purpose to be disclosed.

A wick 83 is disposed within the container 80 and a cap 84 is provided for closing the upper end of the container, this cap having a plug portion 85 adapted to frictionally fit within the container opening and a flange portion 86 adapted to overlie the container opening. The cap 84 is formed with a slot 87 to pass the upper end of the wick 83, and extending from the defining walls of the slot 87 (see Figure 9) is a prong 88 which pierces the upper portion of the wick and prevents unintentional displacement of the wick. A small opening 89 is provided near the top of the container for filling purposes, and such opening is accessible through one of the elongated viewing slots 37, 38 formed in the side walls of the body 16. On assembly, the defining walls of the slot 87 in the cap 84 pinch the upper portion of the wick 83 against a defining wall of the opening into the container 80, and the outer extending portion of the wick is thereby curled forwardly, as best seen in Figures 2 and 4.

The container 80 is guided for upright sliding motion with respect to the body 16 by the rib 26 and the spaced ribs 27. A machine screw 90 (see Figures 2, 3 and 4) is threaded into the side wall 23 of the body 16 in position so that its extremity is engageable with the shoulder formed by either one of the upper or lower heads 81, 82. Engagement with the lower head 82 will prevent the container from being entirely withdrawn from the body 16, and the purpose for engagement with the upper head 81 will presently appear.

Secured to the bottom wall 17 of the base 15 in any suitable manner, and extending upwardly therefrom is a leaf spring 91 which has its upper end curled, as shown at 92. In the outer position of the body 16, the curled end 92 of the spring 91 is engageable with the under surface of the lower head 82 and yieldably supports the container in an upper position wherein the outer end of the wick 83 is spaced from the under surface of the tape T, as seen in Figure 2.

As the body 16 is pressed inwardly of the base 15, the curled end 92 of the spring 91 still supports the container 80 so that such container is moved relative to the body 16 and is thus pressed into engagement with the under surface of the tape T as the tape is moved therepast, and the mucilage portion of the tape is moistened by such engagement. As the body 16 is further pressed inwardly of the base 15, the container 80 is held against further relative movement with respect to the body 16 by reason of the fact that the extended portion of the wick 83 bears against the under surface of the tape T. Therefore, the under surface of lower head 82 is caused to press against the curled end 92 of the spring 91, and the spring is flexed to the left (as viewed in Figure 2) and the curled end 92 slides along the side of the lower head until it reaches the reduced area between the upper and lower heads, whereupon the curled end 92 will move into such reduced area and will permit the container to drop by gravity until the under surface of the upper head 81 engages with the curled end 92 of the spring 91. The container 80 is thus dropped sufficiently so that the extended portion of the wick 83 is out of engagement with the under surface of the tape T.

On spring-pressed return movement of the body 16, the end of machine screw 90 engages under the upper head 81 and draws the container 80 upwardly, thereby causing flexing of the spring 91 so that the curled end 92 wipes across the surface of the lower head 82 and finally snaps back under the lower head to again support the container in position shown in Figure 2.

The tape severing knife 30 comprises a flat blade which is guided for upright movement by the defining walls of the slots 29 and in position so that its cutting extremity moves through the shearing edges formed by the slots 54, 53 of the tape-guiding piece 45, and into the recess 55 of the cap 42 when the body 16 is pressed completely inwardly of the base 15. Thus, as the cutting extremity of the knife passes through the shearing edges of the slots 54, 53, the tape portion extending through the tape-guiding piece 45 is severed. A coil spring 95 has its upper end connected to the knife 30 and its lower end connected to the lower inner surface of the end wall 24 of the body 16. Therefore, the knife 30 is constantly urged in a downward direction by the spring. However, the blade of the knife is of such length that its lower end will engage the inner surface of the bottom wall 17 of the base 15 prior to the time that the body 16 has been completely pressed inwardly of the base 15. Thus, the knife edge is moved through the slots 54, 53 of the tape-guiding piece 45 to sever the tape.

The sequence of operations will now be described, it being assumed that tape from the roll 40 has been extended and threaded through the tape-guiding piece 45 sufficiently so that its extremity extends beyond the slots 54, 53 of such piece. Upon initial inward movement of the body 16, the container 80 is held by the spring 91 so that the extended portion of the wick 83 engages the under surface of the tape T. Preferably shortly thereafter, the legs of the pawl 77 engage adjacent pairs of rollers 74 on the wheel 62, and the wheel is rotated to feed the tape forward.

Preferably, just prior to the time feeding of the tape is interrupted by reason of the legs of the pawl leaving the rollers 74, the curled end 92 of spring 91 enters the space between the upper and lower heads 81, 82 of the container 80, and the container drops to positions shown in Figure 4, wherein it is supported by engagement of the curled end 92 with the under surface of the upper head 81 and in such position the wick is out of engagement with the under surface of the tape. Preferably just after feeding of the tape is interrupted, the cutting edge of the knife 30 is moved through the slots 54, 53 of the tape-guiding piece 45 to sever the extended and moistened tape portion.

Since the rollers 74 are equally spaced about the wheel 62, the feed of tape will be exactly the same for each operation and such feed may be predetermined by proper spacing of the rollers 74. In the present case, the feed is of such length that the outer end of the severed portion of the tape will abut a finger 96 (see especially Figure 4). Since the tape is held by engagement of the wheel 62 with the roller 57 and also abuts the finger 96 at the end of feeding operation, the tape will not tend to crawl during cutting operation by the knife 30.

Figures 12 through 15 illustrate generally diagramatically step-by-step operations of the moistening device and the knife. In Figure 12, the wick 83 is in contact with the tape T and the tape is being fed in the direction of the arrow. Figure 12 illustrates the condition when the wick 83 is just ready to drop from contact with the tape. Thus the point marked *a* represents the most rearward point of moisture on the extended tape portion T*e*.

In Figure 13, the wick 83 has been dropped from contact with the tape but the tape has been fed so that point *a* has been moved forward to the position shown. The knife 30 is shown in position ready to cut the tape and sever the extended portion T*e* from the remaining tape portion. Thus, it will be appreciated that the extended tape portion T*e* is not moistened in an area extending inwardly from the rear edge of such portion.

In Figure 14, the extended tape portion is shown severed and moved for use and the wick 83 has again been moved into contact with the tape T. Because of the bent end of the wick 83, the tape is not moistened in an area extending inwardly from its front edge so that the tape portion is only moistened a distance represented by the dimension *b*. In the presently disclosed embodiment, the wick 83 is of a width that is less than the width of the tape and therefore only an intermediate longitudinal portion of the tape will be moistened. Accordingly, the severed tape portion will be moistened only in the area indicated by the stippling in Figure 15.

My improved tape dispenser may be used by persons involved in the stamp collecting art, and the dispenser may be so constructed and arranged that it will dispense stamp hinges. A stamp hinge comprises a thin piece of paper of a size such as shown in Figure 15 and the paper is provided with mucilage on one surface thereof. In use, the hinge is folded along a transverse line, such as the line 91, with the mucilage portions disposed outwardly. If the hinge is formed by the dispenser herein disclosed, the mucilage is already moistened so that a stamp may be stuck to one flap of the hinge and the other flap may be stuck to a supporting surface, such as a page in a stamp collecting book.

As seen in Figure 1, when the body 16 has been spring-pressed to outer position, the severed tape portion T*e* extends partially outwardly of the guiding piece 45, and such extension may be regulated to proper amount so that the extended portion is the right length to form a hinge flap. A user may position a stamp S on his finger and press such stamp against the hinge flap, the outer surface of the end wall 24 of the body 16 providing a gage against which an edge of the stamp may be abutted. After the stamp S has been stuck to the hinge flap, the user may move his finger upwardly so as to bend the extended hinge flap about the edge 97 of the cap 42 and thus form the other flap of the hinge. The now folded portion T*e* may be withdrawn from the dispenser and the stamp may be immediately mounted on a page of a collecting book.

As best seen in Figure 4, the end walls 20 and 24 of the base 15 and body 16, respectively, are provided with notches 98, 99, respectively, these notches being of sufficient depth so that the undersurface of the tape is maintained clear of contact with the end walls so that mucilage will not collect and interfere with smooth operation of the dispenser. If desired, an additional cap 100 may be provided to protect the tape roll and tape from deposit of any foreign material which may affect smooth operation of the dispenser. The cap 100 may provide apertures which fit over projections 102 extending upwardly from the upper surface of the side walls 22, 23.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. Adhesive tape dispensing means, comprising: first and second bodies connected for relative movement, one of said bodies having means for carrying a roll of adhesive tape; driving means engageable with the tape and actuated by relative movement of said bodies to move said tape in dispensing manner; moistening means operable to have wiping engagement with the dispensed tape and actuated by relative movement of said bodies; and knife means, actuated by relative movement of said bodies and operable to sever the dispensed tape.

2. Adhesive tape dispensing means, comprising: a base; a body slidably mounted on said base and having means for carrying a roll of tape, said body having a guide for receiving a portion of the tape extended from said roll; a tape moistening device supported by said base and adapted to be in moistening engagement with said tape at least during a portion of the time said tape is moved so as to moisten at least a portion of said tape as it is fed thereby; shiftable means carried by said body and frictionally engageable with said extended tape portion; drive means carried by said base and engageable with said shiftable means through sliding action of said body to drive said shiftable means and cause the same to feed and further extend said tape portion; and knife means actuated by sliding action of said body after said tape portion has been further extended a predetermined amount, to sever at least a part of said tape portion.

3. Adhesive tape dispensing means, comprising: a base; a body slidably mounted for movement in a direction toward and resiliently urged in a direction away from said base and having means for carrying a roll of tape, said body having a guide for receiving a portion of the tape extended from said roll; a tape moistening device supported by said base and adapted to be in moistening engagement with said tape at least during a portion of the time said tape is moved so as to moisten at least a portion of said tape as it is fed thereby; wheel means rotatably carried by said body and having a peripheral friction surface engageable with said tape portion and also having a plurality of spaced-apart transversely extending members; pawl means pivotally carried by said base and spring-pressed to position for engagement with an adjacent one of said members through sliding action of said body in a direction toward said base to rotate said wheel means a predetermined amount defined by the period of interengagement with said adjacent member, said pawl means swinging past said adjacent member on movement of said body away from said base and adapted for engagement with a succeeding member on the succeeding inward movement of said body; and knife means slidably carried by said body and resiliently urged to retracted position, said knife means bearing against a portion of said base when said body is moved in a direction toward said base and being thus extended to sever at least a part of said tape portion.

4. Adhesive tape dispensing means, comprising: a base; a body slidably mounted on said base and having means for carrying a roll of tape; driving means, in part carried by said base and in part carried by said body, and positioned so that a portion of the tape extended from said roll may be engaged by a rotatable portion of said driving means, said driving means being rotated by sliding movement of said body to engage said tape portion and move it to effect unwinding action of tape from said roll; knife means, actuated by sliding movement of said body after said tape portion has been moved a predetermined amount, to sever the extended portion of said tape; moistening means shiftably carried by said body for movement toward and away from said tape and having spaced-apart abutment portions; spring means carried by said base and having a portion engageable with one of said abutment portions, the foregoing construction being such that during initial movement of said body in one direction said spring portion supports said moistening means for engagement with said tape, and during later stages of movement of said body in said one direction said spring portion disengages with said one abutment portion so that said moistening means is no longer supported for engagement with said tape; and means carried by said body and engageable with the other said abutment portion when movement of said body is reversed, such engagement effecting movement of said moistening means with said body to position wherein said one abutment portion re-engages with said spring portion.

References Cited in the file of this patent

UNITED STATES PATENTS

| Number | Name | Date |
|---|---|---|
| Re. 22,981 | Fitch | Mar. 9, 1948 |
| 574,780 | Britton | Jan. 5, 1897 |
| 842,948 | Elliott | Feb. 5, 1907 |
| 843,101 | Roberts | Feb. 5, 1907 |
| 947,202 | Moore | Jan. 18, 1910 |
| 948,944 | Moore | Feb. 8, 1910 |
| 1,058,958 | Frohn | Apr. 15, 1913 |
| 1,185,991 | Fleming | June 6, 1916 |
| 1,384,090 | Rideout | July 12, 1921 |
| 2,095,894 | Tarr | Oct. 12, 1937 |
| 2,147,223 | Vergobbi | Feb. 14, 1939 |
| 2,285,507 | Gilliam | June 9, 1942 |
| 2,445,574 | Grunow | July 20, 1948 |